United States Patent
Moteki et al.

(10) Patent No.: US 9,405,182 B2
(45) Date of Patent: Aug. 2, 2016

(54) IMAGE PROCESSING DEVICE AND IMAGE PROCESSING METHOD

(71) Applicant: FUJITSU LIMITED, Kawasaki-shi, Kanagawa (JP)

(72) Inventors: Atsunori Moteki, Kawasaki (JP); Takahiro Matsuda, Isehara (JP); Taichi Murase, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 228 days.

(21) Appl. No.: 14/082,586

(22) Filed: Nov. 18, 2013

(65) Prior Publication Data

US 2014/0204120 A1 Jul. 24, 2014

(30) Foreign Application Priority Data

Jan. 23, 2013 (JP) ................................ 2013-010425

(51) Int. Cl.
*G06T 19/00* (2011.01)
*G06T 19/20* (2011.01)
*G03B 35/08* (2006.01)
*G03B 17/54* (2006.01)
*G06F 3/042* (2006.01)
*G06F 3/041* (2006.01)

(52) U.S. Cl.
CPC ................ *G03B 35/08* (2013.01); *G03B 17/54* (2013.01); *G06F 3/0416* (2013.01); *G06F 3/0425* (2013.01); *G06T 19/006* (2013.01)

(58) Field of Classification Search
None
See application file for complete search history.

(56) References Cited

U.S. PATENT DOCUMENTS

| 2002/0031264 A1 | 3/2002 | Fujimoto et al. |
| 2006/0210145 A1* | 9/2006 | Lee ................... G01B 11/2513 382/154 |
| 2012/0042288 A1 | 2/2012 | Liao et al. |
| 2013/0222424 A1 | 8/2013 | Morinaga et al. |
| 2014/0118397 A1* | 5/2014 | Lee ....................... G06T 7/0057 345/633 |

FOREIGN PATENT DOCUMENTS

| JP | 3-56402 | 8/1985 |
| JP | 11-219407 | 8/1995 |
| JP | 2003-315912 | 11/2003 |
| JP | 2003-346162 | 12/2003 |
| JP | 2011-43545 | 3/2011 |
| JP | 2011-250198 | 12/2011 |
| JP | 2012-43400 | 3/2012 |
| JP | 2012-103790 | 5/2012 |

OTHER PUBLICATIONS

Suzuki et al. "Addition of interactivity to a printed document through the projection of information by using a projector", Technical Report of IEICE., pp. 1-6, Nov. 2011.
(Continued)

*Primary Examiner* — Tize Ma
(74) *Attorney, Agent, or Firm* — Staas & Halsey LLP

(57) ABSTRACT

An image processing device includes a processor; and a memory which stores a plurality of instructions, which when executed by the processor, cause the processor to execute: acquiring an image including a first object captured by an image sensor; computing, from the image, flatness information on flatness of a projection plane of the first object on which a superimposed image is displayed; and defining a display position of the superimposed image on the basis of the flatness information.

11 Claims, 14 Drawing Sheets

(56) References Cited

OTHER PUBLICATIONS

Kimme et al. Short Communications Graphics and Image Processing "Finding Circles by an Array of Accumulators", pp. 120-122.
Yamashita et al. "Hand Shape Recognition Using Three-dimensional Active Appearance Model", Meeting on Image Recognition and Understanding (MIRU 2012), 5pgs.
Zhang, "A Flexible New Technique for Camera Calibration", IEEE Transactions on Pattern Analysis and Machine Intelligence, pp. 1-21, Dec. 5, 2009.
Liu et al. "Embedded Media Markers: Marks on Paper that Signify Associated Media", pp. 1-10, Apr. 2009.
Harris et al. "A Combined Corner and Edge Detector", Plessy Research Roke Manor, UK, 1988, pp. 147-151.
Rosten et al. "Faster and better: a machine learning approach to corner detection" pp. 1-15, Nov. 17, 2008.

* cited by examiner

FIG. 3

| THREE-DIMENSIONAL RECTANGULAR COORDINATES OF FIRST OBJECT | |
|---|---|
| COORDINATE OF PIXEL (pixel) | DEPTH (m) |
| (0,0) | 0.32 |
| (0,1) | 0.34 |
| (0,2) | 0.37 |
| (0,3) | 0.34 |
| ... | ... |

| IMAGE SENSOR ID | FINGERTIP ID | FINGERTIP COORDINATE (pixel) |
|---|---|---|
| 1 | 1 | (210,260) |
| 1 | 2 | (230,230) |
| 1 | 3 | (240,200) |
| 1 | 4 | (250,220) |
| 1 | 5 | (265,255) |
| 2 | 1 | (190,260) |
| 2 | 2 | (210,230) |
| 2 | 3 | (220,200) |
| 2 | 4 | (230,220) |
| 2 | 5 | (245,255) |

| FINGERTIP ID | DEPTH (m) |
|---|---|
| 1 | 0.36 |
| 2 | 0.32 |
| 3 | 0.34 |
| 4 | 0.33 |
| 5 | 0.34 |

| THREE-DIMENSIONAL RECTANGULAR COORDINATES OF SECOND OBJECT ||| 50 |
|---|---|---|
| FINGERTIP ID | FINGERTIP COORDINATE (pixel) | DEPTH (m) |
| 1 | (200,260) | 0.36 |
| 2 | (220,230) | 0.32 |
| 3 | (230,200) | 0.34 |
| 4 | (240,220) | 0.33 |
| 5 | (255,255) | 0.34 |

FIG. 6

| FEATURE POINT ID | FEATURE POINT COORDINATE (pixel) |
|---|---|
| 1 | (2,3) |
| 2 | (3,8) |
| 3 | (3,16) |
| 4 | (3,19) |
| ... | ... |

FIG. 7

| LATTICE POINT ID (x) | LATTICE POINT COORDINATE (pixel) | NUMBER OF FEATURE POINTS (Ng) |
|---|---|---|
| 1 | (5,5) | 1 |
| 1 | (5,10) | 2 |
| 1 | (5,15) | 2 |
| 1 | (5,20) | 4 |
| 2 | ... | ... |
| ... | ... | ... |

| DISPLAY CANDIDATE REGION ID | UPPER LEFT END COORDINATE OF DISPLAY CANDIDATE REGION (pixel) | NUMBER OF CONTAINED FEATURE POINTS (N) | AVAILABILITY |
|---|---|---|---|
| 1 | (40,35) | 8 | 0.37 |
| 2 | (125,25) | 7 | 0.42 |
| 3 | (130,25) | 7 | 0.00 |
| 4 | (245,295) | 4 | 0.89 |
| ... | ... | ... | ... |

IMAGE PROCESSING DEVICE AND IMAGE PROCESSING METHOD

CROSS-REFERENCE TO RELATED APPLICATION

This application is based upon and claims the benefit of priority of the prior Japanese Patent Application No. 2013-010425, filed on Jan. 23, 2013, the entire contents of which are incorporated herein by reference.

FIELD

The embodiments discussed herein are related to an image processing device, an image processing method, and an image processing program used for information presentation to a document, for example.

BACKGROUND

To date, people have employed paper media for reading documents. Meanwhile, the opportunities to read documents presented in electronic media are increasing thanks to improvements in the performance of computers and the development of the Internet. The advantages of using paper media are that a document having a large size is able to be used for reading, paper media are inexpensive, and the entire sentence is able to be grasped by taking an overall view of the sentence, for example. In contrast, the advantages of using electronic media are that information that changes frequently, such as information on the Internet and animations, is able to be displayed, and electronic media are very portable, for example. In light of such circumstances, new interfaces are being developed. The interfaces coordinate paper media with electronic media while taking the conventional advantages of paper media, thereby improving the utility values of documents.

The above-mentioned interfaces have functions of capturing an image of a document printed on a paper medium and placed in front of the user, by using a camera fixed to an arbitrary location or a freely movable camera, to acquire a document image, and then displaying additional information associated with the document. Here, as a technology for displaying additional information, an information presentation method using augmented reality (AR) in which additional information is displayed in a superimposed manner on a document image or a projected paper document has been proposed in recent years. The information presenting method concerned makes it possible to associate additional information with the display position on a document image, so that a paper medium and an electronic medium may be coordinated with each other.

Additionally, techniques have also been developed for implementing support for the user's actions in such a way that annotation information and so on, which is additional information, are displayed in a superimposed manner on a paper medium, and in such a way that the user may perform interaction operations on the annotation information. For example, Suzuki et al., "Addition of interactivity to printed document by projecting information using projector", Institute of Electronics, Information and Communication Engineers, *Technical Report of IEICE*, PRMU 2011-111, pp. 69-74, 2011 discloses an augmented reality technology in which a superimposed image including additional information, which will function as a virtual image, is projected onto a real object such as a paper medium by a projector, so that an annotation associated with the real object is proposed. Additionally, a user interface technology for implementing interaction operations with a superimposed image using detection of gestures such as motions of a user's hand has been disclosed. Additionally, for example, Japanese Laid-open Patent Publication No. 2012-043400 discloses a technology in which, in order to project a superimposed image at a position on a paper medium where the superimposed image is easily visible for the purpose of ensuring visibility of a superimposed image, a document region is estimated from the distribution of locations having distinctive luminance gradients called corners, and the display position of the superimposed image is defined.

SUMMARY

In accordance with an aspect of the embodiments, an image processing device includes a processor; and a memory which stores a plurality of instructions, which when executed by the processor, cause the processor to execute: acquiring an image including a first object captured by an image sensor; computing, from the image, flatness information on flatness of a projection plane of the first object on which a superimposed image is displayed; and defining a display position of the superimposed image on the basis of the flatness information.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 3 is a table illustrating an example of a data structure of three-dimensional rectangular coordinates of a projection plane of a first object computed by a computation unit;

FIG. 4A is a table illustrating an example of a data structure including fingertip coordinates computed by the computation unit;

FIG. 4B is a table illustrating an example of a data structure including the depths of fingertips computed by the computation unit;

FIG. 5 is a table illustrating an example of a data structure of three-dimensional rectangular coordinates of the user's fingertips, each of which serves as a second object, computed by the computation unit;

FIG. 6 is a table illustrating an example of a data structure of feature point IDs extracted by the extraction unit and feature point coordinates;

FIG. 7 is a table illustrating an example of a data structure of the distribution of feature points extracted by the extraction unit;

FIG. 10 is a table illustrating an example of a data structure for display candidate regions computed by the computation unit;

DESCRIPTION OF EMBODIMENTS

Hereinafter, embodiments of an image processing device, an image processing method, and an image processing program according to one embodiment will be described with reference to the drawings. Note that the embodiments are not intended to limit the disclosed techniques.

The present inventors have found out through recent research that a new problem exists in interaction operations for a superimposed image with which annotation information is projected onto a paper medium and which includes additional information. The new problem is as follows. It has been elucidated from the research carried out by the present inventors that, in the above-mentioned method for estimating a document region from the distribution of locations having luminance gradients, when there is an area that is not flat, that is, an uneven area on a projection plane, such as a case where there is an obstacle such as a pen on a document, or a case where a thick document such as a book is imaged, a superimposed image is sometimes projected in an area having low flatness. In such cases, it has been newly found out that the visibility of a superimposed image including additional information and the operability of interactions with the superimposed image (the pressing of the superimposed image) are reduced as compared with the case where a superimposed image is projected onto a flat projection plane. For this reason, as described above, the present disclosure is directed to providing an image processing device that enables the visibility and operability to be improved in interaction operations for a superimposed image.

(First Embodiment)

Figure 1:
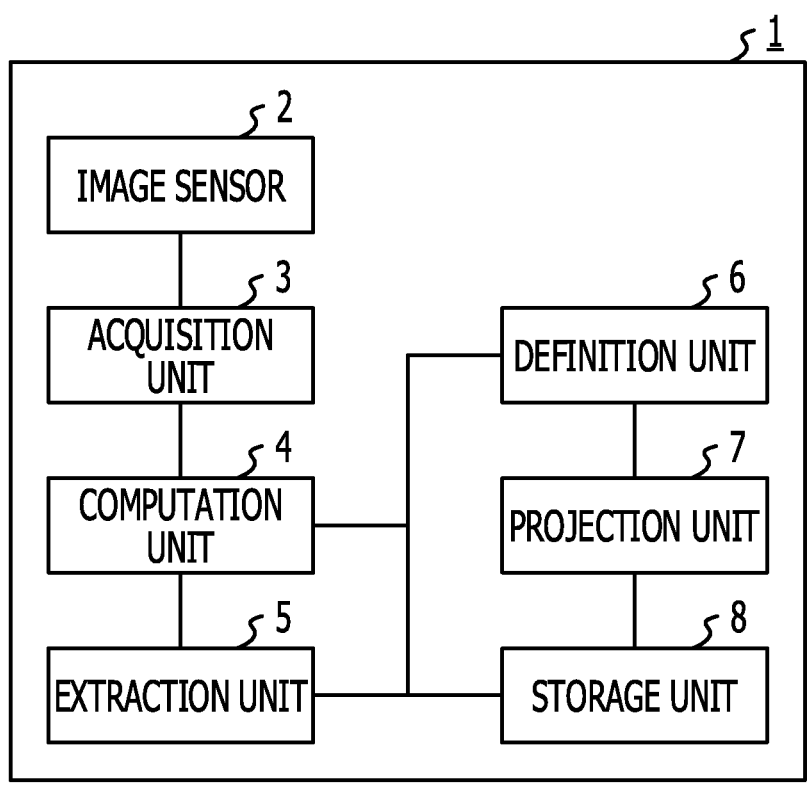
FIG. 1 is a functional block diagram of an image processing device according to one embodiment.

FIG. 1 is a functional block diagram of an image processing device 1 according to one embodiment. The image processing device 1 includes an image sensor 2, an acquisition unit 3, a computation unit 4, an extraction unit 5, a definition unit 6, a projection unit 7, and a storage unit 8. Note that the image processing device 1 includes a communication unit, which is not illustrated, and therefore is capable of using network resources by bidirectionally transmitting and receiving data to and from various external devices through communication lines.

The image sensor 2 is, for example, an imaging device such as a charge coupled device (CCD) or a complementary metal oxide semiconductor (CMOS) camera. Additionally, it is possible to utilize the image sensor 2 as a head mounted camera (HMC). The image sensor 2 captures an image of XX, for example. Note that the image sensor 2 does not have to be included in the image processing device 1. For example, communication over a communication line using a communication unit (not illustrated) provided in the image processing device 1 enables the image sensor 2 to be provided in an external device other than the image processing device 1.

The acquisition unit 3 is a hardware circuit using a wired logic, for example. The acquisition unit 3 may be a functional module implemented by a computer program executed in the image processing device 1. The acquisition unit 3 receives an image captured by the image sensor 2 from the image sensor 2. The acquisition unit 3 outputs the acquired image to the computation unit 4 and the extraction unit 5. Note that the details of the acquisition process performed by the acquisition unit 3 will be described below.

The computation unit 4 is a hardware circuit using a wired logic, for example. The computation unit 4 may be a functional module implemented by a computer program executed in the image processing device 1. The computation unit 4 receives an image from the acquisition unit 3, and computes the three-dimensional rectangular coordinates of a first object or a second object included in the image, the flatness information regarding the flatness of the projection plane of the first object, availability, and so on. The computation unit 4 outputs the computed flatness information and availability to the definition unit 6. Note that the details of the computing processing performed by the computation unit 4 will be described below.

The extraction unit 5 is a hardware circuit using a wired logic, for example. The extraction unit 5 may be a functional module implemented by a computer program executed in the image processing device 1. The extraction unit 5 receives an image from the acquisition unit 3 and extracts a display candidate region where a superimposed image may be to be projected. The extraction unit 5 outputs the extracted display candidate region to the computation unit 4 or the definition unit 6. Note that the details of the extraction processing performed by the extraction unit 5 will be described below.

The definition unit 6 is a hardware circuit using a wired logic, for example. The definition unit 6 may be a functional module implemented by a computer program executed in the image processing device 1. The definition unit 6 defines the display position for a superimposed image on the basis of the flatness information and availability computed by the computation unit 4 and the display candidate region extracted by the extraction unit 5. The definition unit 6 outputs the display position for a superimposed image to the projection unit 7. Note that the details of the definition processing of the definition unit 6 will be described below.

The projection unit 7 is, for example, a display device, such as a projector. The projection unit 7 displays a superimposed image containing additional information, for example. Additionally, the projection unit 7 does not have to be included in the image processing device 1. For example, communication over a communication line using a communication unit (not illustrated) provided in the image processing device 1 enables the projecting unit 7 to be provided in an external device other than the image processing device 1. The projection unit 7 receives the display position for a superimposed image from the definition unit 6 and projects a superimposed image.

The storage unit 8 is, for example, a semiconductor memory device, such as a flash memory, or a storage device, such as a hard disk drive (HDD) or an optical disc. Note that the storage unit 8 is not limited to the above kinds of storage devices, and may be a random access memory (RAM) or a read only memory (ROM). Various data, such as a superimposed image used as additional information, is stored in the storage unit 8 as desired, for example. Note that the storage unit 8 does not have to be included in the image processing device 1. For example, the various data concerned may be stored in caches, memories, and so on (not illustrated) of functional units included in the image processing device 1. In addition, communication over a communication line using a communication unit (not illustrated) provided in the image processing device 1 enables the storage unit 8 to be provided in an external device other than the image processing device 1.

Note that the image processing device 1 may be made up of, for example, integrated circuits, such as application specific integrated circuits (ASICs) and field programmable gate arrays (FPGAs).

Figure 2:
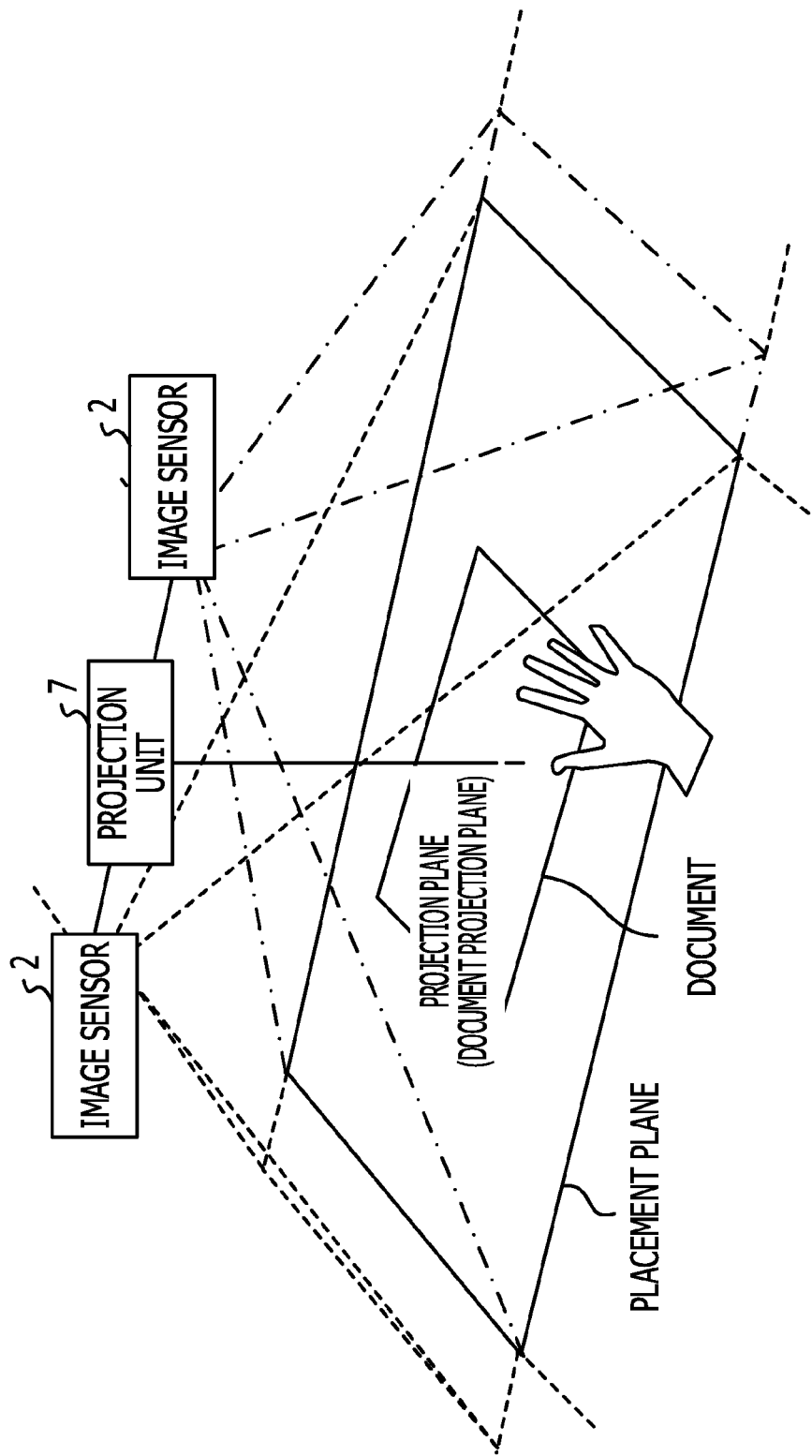
FIG. 2 is a hardware configuration illustration of the image processing device according to one embodiment.

FIG. 2 is a hardware configuration illustration of the image processing device 1 according to one embodiment. As illustrated in FIG. 2, the projection unit 7 is disposed horizontally relative to the placement plane or the ground, defines a projection plane for projecting additional information to a document including at least a character or figure, and is capable of projecting a superimposed image on the document. Note that, for the sake of convenience, the projection plane on the document will be referred to as a "document projection plane". Additionally, the projection unit 7 and two image sensors 2 are disposed above the document projection plane and downward in a direction perpendicular to the document projection plane, for example. The two image sensors 2 whose internal parameters are equally known are disposed in a so-called parallel stereo arrangement where the respective optical axes are parallel to each other and arbitrary horizontal axes in a plurality of images captured by the two image sensors 2 lie on the same straight line. Accordingly, an image containing the document projection plane, color information of a document, and information such as the depth of the document and the depth of the user's fingertip is captured by the image sensors 2. Note that the two image sensors 2 may be disposed so as to be movable under conditions where the parallel stereo arrangement is maintained. This enables the depth of a document to be computed with high accuracy by estimating the direction of characters of the document using an arbitrary image processing method and maintaining the parallel stereo arrangement so that the arrangement is parallel to the direction of characters of the document (in other words, so that the arrangement is not perpendicular to the direction of characters), for example. A superimposed image is projected on the document projection plane by the projection unit 7. The user presents a fingertip on the document projection plane from an arbitrary direction, and performs interaction operations for the projected superimposed image. Note that, in FIG. 2, each function, other than the image sensors 2 and the projection unit 7, disclosed with reference to FIG. 1 may be constituted of an integrated circuit of ASIC, which is not illustrated, for example, and be arranged at the same position as the projection unit 7.

Note that it is assumed that, at the time of configuration of the image processing device 1 illustrated in FIG. 2, alignment (calibration) between the image sensor recognition coordinate system of the image sensor 2 and the projection unit display coordinate system of the projection unit 7 has been performed in advance. When, after the start of use of the image processing device 1, the positional relationship between the image sensors 2 and the projection unit 7 is changed, calibration may be performed at least once. Here, a method in which an arbitrary projection image projected by the projection unit 7 is captured by the image sensor 2, so that calibration is performed inside the image processing device 1, will be described as an example of a specific calibration method. Note that, in that method, calibration is performed for each of the two image sensors 2.

First, the projection unit 7 projects an arbitrary marker for certain arbitrary coordinate values $(x_p, y_p)$ in a projection unit display coordinate system. The marker may use an arbitrary color and an arbitrary shape that are easily distinguishable from the surrounding background. Then, the image sensor 2 captures an image of the marker projected on a predetermined projection plane. Subsequently, the image processing device 1 recognizes the marker using arbitrary known image processing. For example, when the projection unit 7 projects a circular pattern as a marker, the image processing device 1 is able to recognize the circular shape using the Hough circle transform disclosed in Kimme et al., "Finding circles by an array of accumulators", *Communications of the Association for Computing Machinery*, #18, pp. 120-122, and 1975. Here, it is given that the coordinate values when the image processing device 1 recognizes the marker are $(x_i, y_i)$. The image processing device 1 repeats the above processing for four points at arbitrary locations. From four sets each of which is a set of $(x_i, y_i)$ corresponding to $(x_p, y_p)$ obtained by the processing, the image processing device 1 computes elements of a homography matrix H of three rows and three columns using an eight-dimensional simultaneous linear equation. Note that the homography matrix is a matrix representing a projection transformation from one plane to another plane of three-dimensional space. In the first embodiment, the image processing device 1 determines the correspondence between the image sensor coordinate plane of the image sensor 2 and the projection unit coordinate plane of the projection unit 7. The image processing device 1 stores the homography matrix determined by the computation in the storage unit 8, for example. This enables a homography matrix to be utilized when a superimposed image is projected.

(Image Acquisition Processing of Acquisition Unit 3)

The acquisition unit 3 of FIG. 1 receives an image captured by the image sensor 2 from the image sensor 2. Note that, in the first embodiment, at least two image sensors 2 are disposed in a stereoscopic arrangement, and a plurality of image sensors 2 are designed to capture images simultaneously or continuously. Additionally, the resolution of an image captured by the image sensor 2 may have an arbitrary value in accordance with the processing speed of the image processing device 1. Additionally, a document including a character or figure or the user's fingertip, for example, is to be included in an image acquired by the acquisition unit 3. Note that a document including a character or figure may be referred to as a first object, and the user's fingertip may be referred to as a second object. The acquisition unit 3 outputs the acquired image to the computation unit 4 and the extraction unit 5.

(Computation Processing of Three-Dimensional Rectangular Coordinates and Flatness Information of Computation Unit 4)

The computation unit 4 of FIG. 1 receives an image from the acquisition unit 3. The computation unit 4 computes the three-dimensional shape of the document projection plane, that is, the three-dimensional rectangular coordinates of the document projection plane from the image upon the start of processing of the image processing device 1 or during processing of the image processing device 1. In the first embodiment, the computation unit 4 computes the three-dimensional rectangular coordinates of the document projection plane by a method called an active stereo method so that the three-dimensional rectangular coordinates are able to be computed in a region where there is no distinctive pattern such as a corner. The active stereo method is a method for computing three-dimensional rectangular coordinates of an object by projecting a specific pattern, which is one piece of additional information, onto the object by the projection unit 7 and measuring a change in the level of each of pixels of the specific pattern projected by using the image sensor 2.

There are various kinds of active stereo methods. Although any kind of active stereo method is applicable, the computation unit 4 may use a spatial coding method disclosed in Japanese Examined Patent Application Publication No. 3-56402, for example. Using the spatial coding method, the computation unit 4 computes a change in the level of each of the pixels of a projected pattern, assuming that the coordinates of all the pixels of a specific pattern with patternized light and darkness are identifications (IDs). The specific pattern is projected by the projection unit 7 a plurality of times. By using the result, the computation unit 4 is able to compute the depth (m) for each pixel of the specific pattern projected by the projection unit 7 using triangulation. Note that, by using the coordinates and depth of each pixel relative to an arbitrary reference point of the projection unit 7, the computation unit 4 is able to define the three-dimensional rectangular coordinates of the document projection plane of a document serving as the first object. Note that the reference point for the coordinates of pixels may be defined as the upper left end of an image acquired by the acquisition unit 3, for example. Regarding the reference point of the depth, the location at which the projection unit 7 is set up may be defined as the reference point, for example.

FIG. 3 is a table illustrating an example of the data structure of the three-dimensional rectangular coordinates of the projection plane of the first object computed by the computation unit 4. Just as illustrated in a table 30 of FIG. 3, the coordinates of pixels relative to an arbitrary reference point of the projection unit 7 and the coordinates of depths are stored as three-dimensional rectangular coordinates of the document projection plane. Note that the table 30 may be stored in a cache or a memory, which is not illustrated, of the computation unit 4, and may also be stored in the storage unit 8.

The computation unit 4 computes the positions of the user's fingertips serving as the three-dimensional rectangular coordinates of the second object for a plurality of images received from the acquisition unit 3. It is possible for the computation unit 4 to use, as a method of computing the position of the fingertip, various known methods, such as an approach of estimating the fingertip position using image processing, which is disclosed in Japanese Patent No. 3863809, and a method disclosed in Yamashita et al., "Hand shape recognition using three-dimensional active appearance model", *Meeting on Image Recognition and Understanding (MIRU)* 2012, IS3-70, 2012-08, in which learned data for the shape of a hand is held in advance, and the similarity between a currently acquired image and the learned data is computed, so that a fingertip shape is estimated. In the first embodiment, description will be given hereinafter under the assumption that the computation unit 4 uses the above-mentioned method disclosed in Japanese Patent No. 3863809, for the sake of convenience. In the method concerned, the computation unit 4 extracts a flesh-colored color component portion, for example, from an image received from the acquisition unit 3, thereby extracting a hand region outline. Thereafter, after recognizing the number of hands, the computation unit 4 computes the fingertip coordinates from the hand region outline. Note that the computation unit 4 may use appropriate threshold adjustment of red, greed, and blue (RGB) space or hue, saturation, and value (HSV) space for extraction of a flesh-colored color component.

FIG. 4A is a table illustrating an example of the data structure including fingertip coordinates computed by the computation unit 4. The IDs of two image sensors 2 are stored in a table 40 of FIG. 4A. The fingertip coordinates of fingertips computed from images captured by each of the two image sensors 2 when the user extends the fingers of a single hand, for example, are stored in the table 40 in association with the fingertip IDs. The fingertip IDs may be given in increasing order of the coordinate in the horizontal direction, from small to large, for example. Note that the reference point for coordinates of fingertip pixels may be defined as the upper left end of an image acquired by the acquisition unit 3, for example. Additionally, the table 40 may be stored in a cache or memory, which is not illustrated, of the computation unit 4, and may also be stored in the storage unit 8.

Subsequently, the computation unit 4 computes the depth of the user's fingertip. In the first embodiment, description will be given of computing of the depth of the user's fingertip captured by the two image sensors 2 (in other words, a stereo camera). Given that the length of a line segment between the two image sensors 2 is b, the focal length of the image sensor 2 is f, and the right and left corresponding two-dimensional rectangular coordinates are (u, v) and (u', v'), respectively, the computation unit 4 is able to compute the depth Z in the depth direction relative to an arbitrary reference point of three-dimensional rectangular coordinates serving as three-dimensional space, on the principle of triangulation, by the following expression.

$$Z = \frac{bf}{u - u'} \tag{1}$$

The computation unit 4 computes the depth of the top portion of each finger, which is the fingertip, using expression 1 mentioned above. Note that, for estimation of the internal parameters of the image sensor 2 for computing the focal length f, Zhang et al., "A flexible new technique for camera calibration", *IEEE Transactions on Pattern Analysis and Machine Intelligence,* 22 (11), pp. 1330-1334, 2000, for example, may be used.

In the computation unit 4, for example, IDs are given to fingertips in increasing order of the coordinate in the horizontal direction, from small to large, for a plurality of image sensors 2 disposed in the side-to-side direction as illustrated in FIG. 2, the fingertip points having the same ID are regarded as the corresponding points, and substitution into the above expression 1 is performed for each corresponding point, so that the depth Z is computed. FIG. 4B is a table illustrating an example of the data structure including the depths of fingertips computed by the computation unit 4. In a table 41 of FIG. 4B, the same IDs as fingertip IDs of the table 40 of FIG. 4A are given as the fingertip IDs, and the depth corresponding to each fingertip ID is stored. Note that, regarding the reference point for the depth concerned, the location at which the projection unit 7 is set may be regarded as the reference point, for example. Additionally, the table 41 of FIG. 4B may be stored in a cache or memory, which is not illustrated, of the computation unit 4, and may also be stored in the storage unit 8.

The computation unit 4 defines the three-dimensional rectangular coordinates of the user's fingertip serving as the second object using the data structure of the table 40 of FIG. 4A and the table 41 of FIG. 4B. FIG. 5 is a table illustrating an example of the data structure of the three-dimensional rectangular coordinates of the user's fingertip serving as the second object computed by the computation unit 4. In a table 50 of FIG. 5, the fingertip IDs and the depths are the same as in the data structure of the table 41 of FIG. 4B. Additionally, the fingertip coordinates are coordinates obtained by averaging the fingertip coordinates disclosed in the table 40 of FIG. 4A for each fingertip ID. Note that, in the table 50 of FIG. 5, the reference point for fingertip coordinates may be defined as the upper left end of an image acquired by the acquisition unit 3, for example. Additionally, regarding the reference point for the depth, the location at which the projection unit 7 is set may be regarded as the reference point, for example. The table 50 of FIG. 5 may be stored in a cache or memory, which is not illustrated, of the computation unit 4, and may also be stored in the storage unit 8.

(Processing of Extracting Display Candidate Regions Performed by Extraction Unit 5)

The extraction unit 5 of FIG. 1 receives an image from the acquisition unit 3, and extracts a display candidate region for projection of a superimposed image. Note that the extraction unit 5 may carry out a determination as to the pressing of the user's fingertip, if desired, when extracting a display candidate region. In the first embodiment, an example where the extraction unit 5 carries out a determination as to the pressing by detecting a contact of a fingertip with the document projection plane will be described. It is possible for the extraction unit 5 to acquire in advance the depth of the document projection plane computed using the above-mentioned active stereo method by the computation unit 5 at the time of the start of processing of the image processing device 1, and detect that the fingertip is pressed when the depth of the fingertip lies within a predetermined threshold range for the depth of the document projection plane. Note that if the depths of a plurality of fingertips lie within the predetermined threshold range, the extraction unit 5 may regard that the plurality of fingertips are pressed.

The extraction unit 5 extracts a display candidate region if it is detected that at least one fingertip is pressed. In the first embodiment, a method in which the extraction unit 5 extracts a display candidate region, for example, by utilizing, in part, a layout analysis approach disclosed in Liu et al., "Embedded Media Markers: Marks on Paper that Signify Associated Media", *In proc. of IUI*, pp. 149-158, 2010, will be described. First, the extraction unit 5 acquires the size of a superimposed image that the projection unit 7 is scheduled to project, from a table (not illustrated) stored in the storage unit 8, for example. Note that the size of a superimposed image stored in the table concerned is specifically the length and breadth (pixel) at the time of approximating the superimposed image to the rectangular shape, and the size has values of (length, breadth)=(50, 60), for example.

Subsequently, the extraction unit 5 grayscales an image acquired from the acquisition unit 3. Next, the extraction unit 5 extracts feature points for a corner point of the grayscaled image. The extraction unit 5 may use an approach of extracting feature points of an arbitrary corner point, such as the Harris operator disclosed in Harris et al., "A Combined Corner and Edge Detector", *In proc. of the Alvey Vision Conference*, pp. 147-151, 1988, or FAST disclosed in Rosten et al., "FASTER and better: A machine learning approach to corner detection", *IEEE Trans. Pattern Analysis and Machine Intelligence*, vol. 32, pp. 105-119, 2008. FIG. 6 is a table illustrating an example of the data structure of feature point IDs extracted by the extraction unit 5 and feature point coordinates. As illustrated in a table 60 of FIG. 6, the extraction 5 provides a feature point ID each time a feature point is extracted, and associates the feature point ID with feature point coordinates at which the feature point is extracted. Note that the reference point serving as the origin point of the feature point coordinates may be an upper left end of an image acquired by the acquisition unit 3, for example.

The extraction unit 5 carries out feature point distribution measurement next. The extraction unit 5 divides an image acquired from the acquisition unit 3 into blocks each of which is five pixels square, and measures the number Ng (X) of feature points included in a rectangle made up of lattice points X and an arbitrary origin point of the image. In this case, the number of feature points including in an arbitrary rectangular region ABCD is Ng(C)+Ng(A)−Ng(B)−Ng (D), where the point nearest to the origin point serving as a reference point is A, and the point furthest from the origin point is C. The extraction unit 5 repeats the feature point distribution measurement concerned for all the lattice points X. FIG. 7 is a table illustrating an example of the data structure of the distribution of feature points extracted by the extraction unit 5. As illustrated in a table 70 of FIG. 7, a lattice point ID (x) is provided to the arbitrary rectangular region ABCD mentioned above, and a lattice point coordinate and the number of feature points are stored in association with the lattice point ID (x) concerned. Note that the table 70 may be stored in a cache or memory, which is not illustrated, of the extraction unit 5, and may also be stored in the storage unit 8.

The extraction unit 5 searches for a display candidate region next. The extraction unit 5 slides the image acquired from the acquisition unit 3 from the upper left end to the lower right end by the above-mentioned block for a region of the size of a superimposed image acquired in advance, measures the number of feature points N of each region, and regards the rectangular region as a display candidate region if the number of feature points N is equal to or less than a predetermined feature point number threshold Nt (for example, Nt=10). Note that if there is no display candidate region whose number of feature points N is less than the feature point number threshold Nt, the extraction unit 5 increases the feature point number threshold Nt by a predetermined certain number and determines again whether there is a display candidate region. This determination enables a superimposed image to be displayed at some location even in an image in which feature points are distributed over the entire image. Using the method described above, the extraction unit 5 may extract a display candidate region.

(Computation Processing of Three-Dimensional Rectangular Coordinates and Flatness Information of Computation Unit 4)

The computation unit 4 computes the availability based on the flatness of a display candidate region. Using the three-dimensional rectangular coordinates of the projection plane of the first object and the three-dimensional rectangular coordinates of the second object computed by the computation unit 4, and so on, for each display candidate region obtained by display candidate region search performed by the extraction unit 5, the computation unit 4 defines availability p by the following expression. Note that the availability p has a value in a range equal to or larger than 0 and equal to or less than 1, and the larger the value, the more the display candidate region is suitable for display of a superimposed image.

$$p = p_t p_f p_c \qquad (2)$$

In expression (2) mentioned above, $p_t$ is a term of visibility of a superimposed image depending on the presence or absence of a corner (in other words, the term regarding the frequency of the corner included in a display candidate region) and is expressed by the following expression.

$$p_t = 1 - \frac{N}{\alpha N_t} \qquad (3)$$

As may be understood from expression (3) mentioned above, the smaller the number of corners included in a display candidate region, the higher value the $p_t$ has. Note that although, in expression (3), a refers to the tolerance of a corner and may be set appropriately in accordance with the application use of the image processing device 1, α=2 may be set, for example.

In expression (2) mentioned above, $p_f$ is a term for inhibiting the user's hand region and a superimposed image from overlapping (in other words, a term for inhibiting a superimposed image from being projected onto the hand region) and is expressed by the following expression.

$$p_f = 1 - \frac{A_{sf}}{A_s} \quad (4)$$

In order to compute $p_f$, the computation unit 4 utilizes the above-mentioned hand region outline computed by the computation unit 4 and defines a hand region. The computation unit 4 computes the number of pixels $A_s$ of a display candidate region and the number of pixels $A_{sf}$ of a portion that is a display candidate region and is a hand region, and computes $p_f$ using expression (4) mentioned above. The term of $p_f$ enables a superimposed image to be inhibited from being projected on a region in which there is no corner point like a palm and which is not suitable for projection.

In expression (2) mentioned above, $p_c$ is a term for the flatness of the document projection plane (in other words, the term indicating the degree of unevenness in a display candidate region of the document projection plane) and is expressed by the following expression.

$$p_c = \begin{cases} 1 & (c \leq \theta_c) \\ \frac{\theta_c}{c} & (c > \theta_c) \end{cases} \quad (5)$$

$$c = c_c + \beta c_o$$
$$= \frac{1}{I \cdot J} \sum_{i=1}^{I} \sum_{j=1}^{J} (|d_{i+1,j} - d_{i,j}| + |d_{i,j+1} - d_{i,j}|) + \beta \frac{1}{I \cdot J} \sum_{i=1}^{I} \sum_{j=1}^{J} d_p$$
$$= \frac{1}{I \cdot J} \sum_{i=1}^{I} \sum_{j=1}^{J} (|d_{i+1,j} - d_{i,j}| + |d_{i,j+1} - d_{i,j}| + \beta d_p)$$

$$d_p = \begin{cases} |d_{i,j+1} - d_{i,j}| & ((d_{i,j+1} - d_{i,j}) < 0) \\ 0 & \text{otherwise} \end{cases}$$

The computation unit 4 is able to compute the value of c from the three-dimensional rectangular coordinates of the projection plane of the first object for a display candidate region. Note that, in expression (5) mentioned above, although c is a linear sum of $c_c$ indicative of the frequency of unevenness and $c_o$ indicative of the frequency of an invisible region produced by hiding of a superimposed image caused by unevenness, and $c_c$ and $c_o$ each affect the operability and visibility, $c_c$ affects, in particular, the operability and $c_o$ affects, in particular, the visibility. As may be understood from expression (5) mentioned above, the larger the values of $c_c$ and $c_o$ are, the smaller the value of $p_c$ is and the more the availability decreases. Note that, in expression (5), it is given that $d_{i,j}$ is the depth (m) in coordinates (i, j) in a display candidate region, and I, J are the lateral and vertical numbers of pixels of the display candidate region. Note that the term of $c_c$ may be referred to as flatness information regarding the flatness of the projection plane of the first object.

Figure 8A:
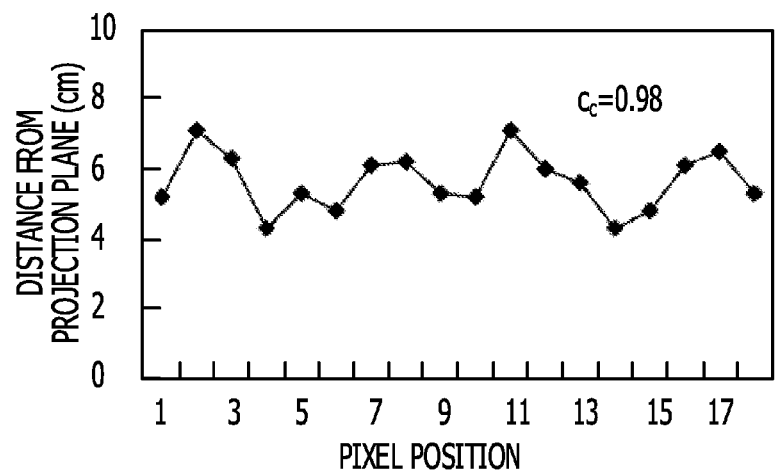
FIG. 8A is a conceptual graph of cc in the case where an obstacle such as a pen is placed in a display candidate region.
Figure 8B:
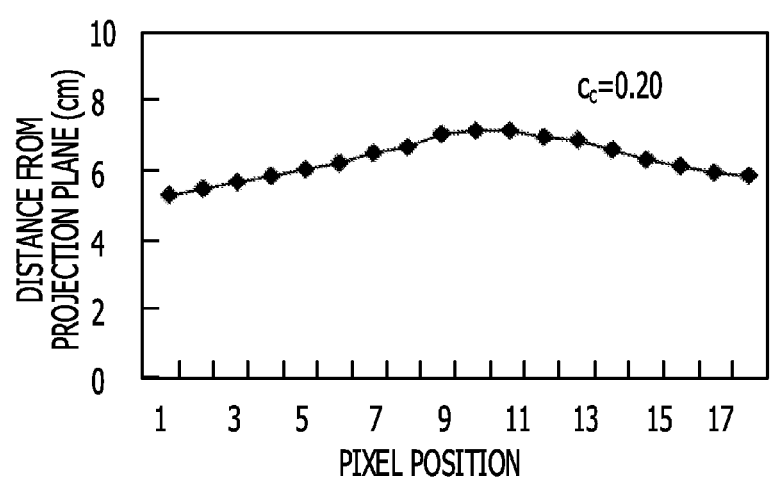
FIG. 8B is a conceptual graph of cc in the case where a deformation occurs in the display candidate region.
Figure 8C:
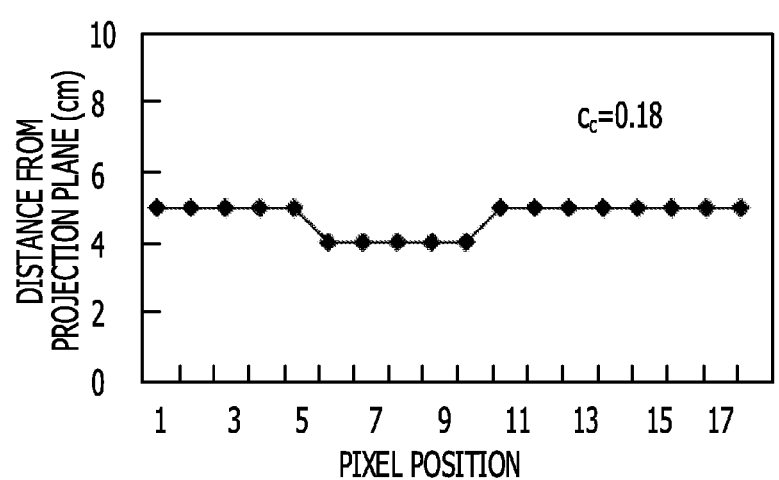
FIG. 8C is a conceptual graph of cc in the case where a display candidate region exists at a location, such as a location between books.

In expression (5) mentioned above, $c_c$ is a value obtained by totaling differences in depth between adjacent pixels in a display candidate region, over the entire display candidate region. If $c_c$ is large, unevenness will exist frequently and the flatness will become low. The image projection onto an area with large unevenness causes a decrease in the operability and visibility at the time of pressing a fingertip, and therefore the term of $c_c$ is applied in order to avoid an area with large unevenness. FIG. 8A is a conceptual graph of $c_c$ in the case where an obstacle such as a pen is placed in a display candidate region. FIG. 8B is a conceptual graph of $c_c$ in the case where a deformation occurs in the display candidate region. FIG. 8C is a conceptual graph of $c_c$ in the case where the display candidate region exists at a location, such as a location between books. In the graphs illustrated in FIG. 8A to FIG. 8C, the horizontal axis represents the x direction or the y direction of an image, and the vertical axis represents an example of distribution of the depth relative to the placement point of the projection unit 7. The larger the unevenness (the lower the flatness), the larger the term $c_c$.

Figure 9:
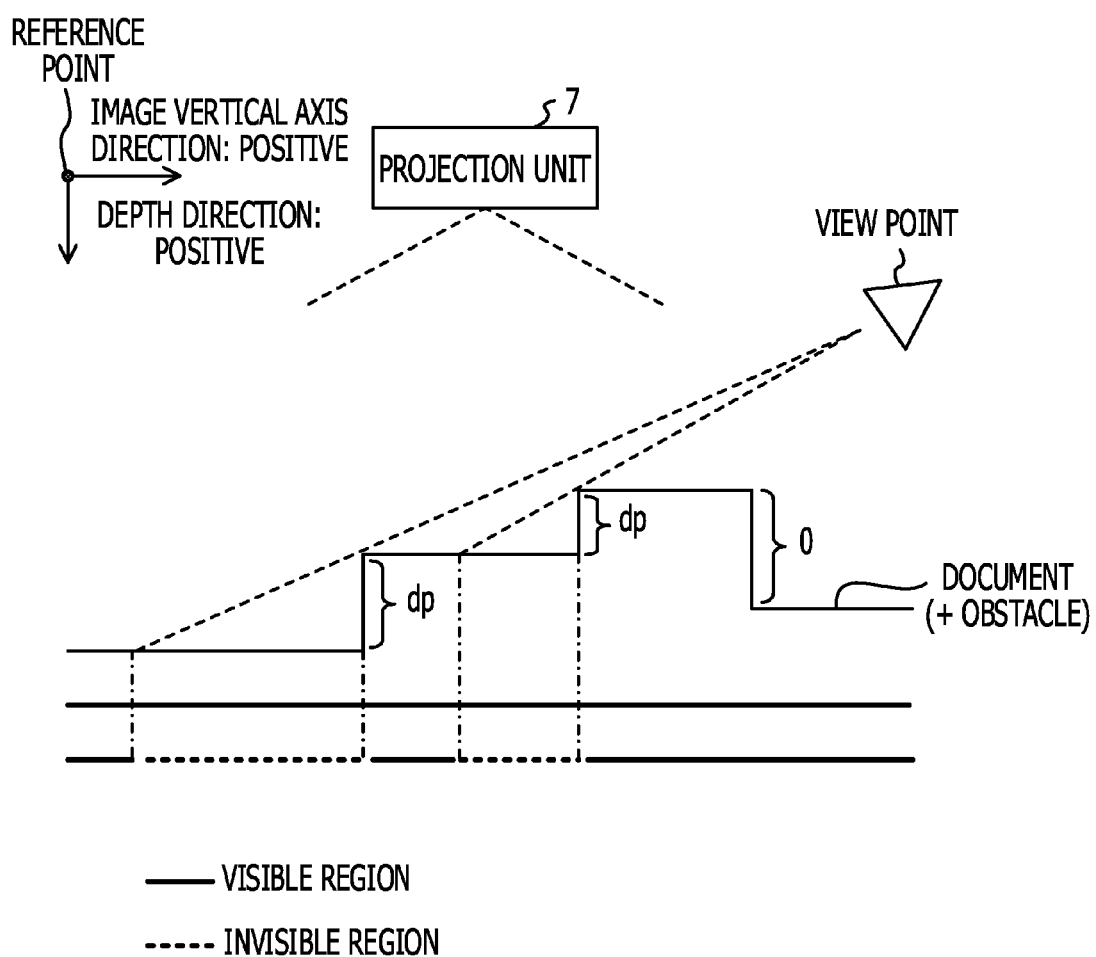
FIG. 9 is a conceptual chart of invisible regions produced by hiding of a superimposed image.

In expression (5) mentioned above, $c_o$ is a value obtained by totaling differences $d_p$ in depth, which are related to invisible regions produced by hiding of a superimposed image, over the entire display candidate region. Assuming that the downward direction of an image is a positive direction, if the depth value decreases in the positive direction, $d_p$ has the absolute value of the depth value; otherwise, $d_p$ has a value of 0. FIG. 9 is a conceptual chart of invisible regions produced by hiding of a superimposed image. In the image processing device 1 in the first embodiment, it is assumed that the user sticks out a fingertip from a place lower than the projection unit 7 and performs interactive operations. For this reason, as illustrated in FIG. 9, according to the height and angle of the user's viewpoint, a superimposed image is sometimes hidden under the influence of unevenness of the display candidate region, and, as a result, the visibility decreases. As may be understood from FIG. 9, a superimposed image is hidden if the depth decreases in the positive direction. Therefore, the computation unit 4 sums up depth differences at this point to compute the value of $c_o$. The larger the value of $c_o$, the larger the area of a hidden region. Here, β represents the influence of $c_o$ on $c_c$, and is selectable in accordance with the application. Usually, β has a value of about β=2.

From the above, using the value of c computed by the computation unit 4, it is possible to determine the value of $p_c$ depending on whether c is larger or smaller than a predetermined arbitrary threshold θc. Note that although the threshold θc may be suitably changed in accordance with the application of the image processing device 1, the threshold θc may have a value of 0.01 (m), for example. Note that the term of $p_c$ may be referred to as a dispersion relative to the reference point of the display candidate region, and the threshold θc may be referred to as a first threshold. FIG. 10 is a table illustrating an example of the data structure for display candidate regions computed by the computation unit 4. In a table 100 of FIG. 10, the upper left end coordinate of a display candidate region, the number of contained feature points, and the availability are stored for each display candidate region ID.

(Processing of Defining Display Position of Superimposed Image Performed by Definition Unit 6)

The definition unit 6 of FIG. 1 defines the display position of a superimposed image. The definition unit 6 is capable of defining the display position of a superimposed image (defining one region from a plurality of display candidate regions) on the basis of the availability illustrated in the table 100 of FIG. 10 and the flatness information computed from expression (5) mentioned above. The definition unit 6 may also compute the fingertip coordinates and the Euclidean distances among display candidate regions, and define the display candidate region with a minimum Euclidean distance as the display position. The definition unit 6 defines the display position of a superimposed image using the processing mentioned above, and outputs the display position of the superimposed image to the projection unit 7.

After defining the display position of a superimposed image, the definition unit 6 may determine the display state of the superimposed image. That is, the definition unit 6 may change the display state (the complementary color, the direction of lines of a document, and the size of characters of the document) of a superimposed image to a suitable state that allows the user to easily read the document. Regarding the complementary color, a superimposed image is displayed using a color complementary to the color information of a position of a display candidate region at which the superimposed image is to be projected. Regarding the direction of lines of a document, the definition unit 6 acquires in advance the direction of lines using a method disclosed in Japanese Laid-open Patent Publication No. 11-219407. Then, the definition unit 6 causes the direction of characters in a document with the direction of characters of a superimposed image. Regarding the size of a character, the size of a character existing in close proximity to the display candidate region is acquired, for example, using the method disclosed in Japanese Laid-open Patent Publication No. 11-219407. Then, the definition unit 6 causes the character size of the superimposed image to have a value that is more than that of the character size in the document and which does not exceed the range of the display candidate region in which the superimposed image is to be displayed. Note that, after defining the display position, the definition unit 6 may expand or contract the display region to a certain extent and compute again the availability, thereby performing fine adjustment so that the availability is maximized. By performing such processing, it becomes possible to project a superimposed image of a suitable size, and therefore the visibility with respect to the content of a superimposed image may be inhibited from decreasing. Regarding the viewpoint of operability, by projecting a superimposed image on a place near a hand, the time taken for interaction operations may be reduced. Additionally, a superimposed image having a size suitable for interaction operations is projected. This may reduce the user's operation mistakes at the time of pressing a fingertip, or the like.

The definition unit 6 outputs the display position of a superimposed image to the projection unit 7, and causes the projection unit 7 to project the superimposed image onto the display position concerned and to update the display region. With respect to the display region, from a homography matrix between the image sensor recognition coordinate system of the image sensor 2 and the projection unit display coordinate system of the projection unit 7, which has been acquired in advance, the definition unit 6 also determines the coordinates of the projection plane on which a superimposed image is to be projected (in other words, the plane rectangular coordinates serving as the display position of a superimposed image) by the following expression. For example, it is given that $(x_{src}, y_{src})$ is the main coordinates of the display position in the image sensor recognition coordinate system of the image sensor 2, and $(x_{dst}, y_{dst})$ is the main coordinates of the display position in the projection unit display coordinate system of the projection unit 7. In the following expression, elements of $h_{11}$ to $h_{33}$ are an inverse matrix $H^{-1}$ of the homography matrix obtained by the calibration mentioned above.

$$x_{dst} = \frac{h_{11}x_{src} + h_{12}y_{src} + h_{13}}{h_{31}x_{src} + h_{32}y_{src} + h_{33}} \qquad (6)$$

$$y_{dst} = \frac{h_{21}x_{src} + h_{22}y_{src} + h_{23}}{h_{31}x_{src} + h_{32}y_{src} + h_{33}}$$

Figure 11:
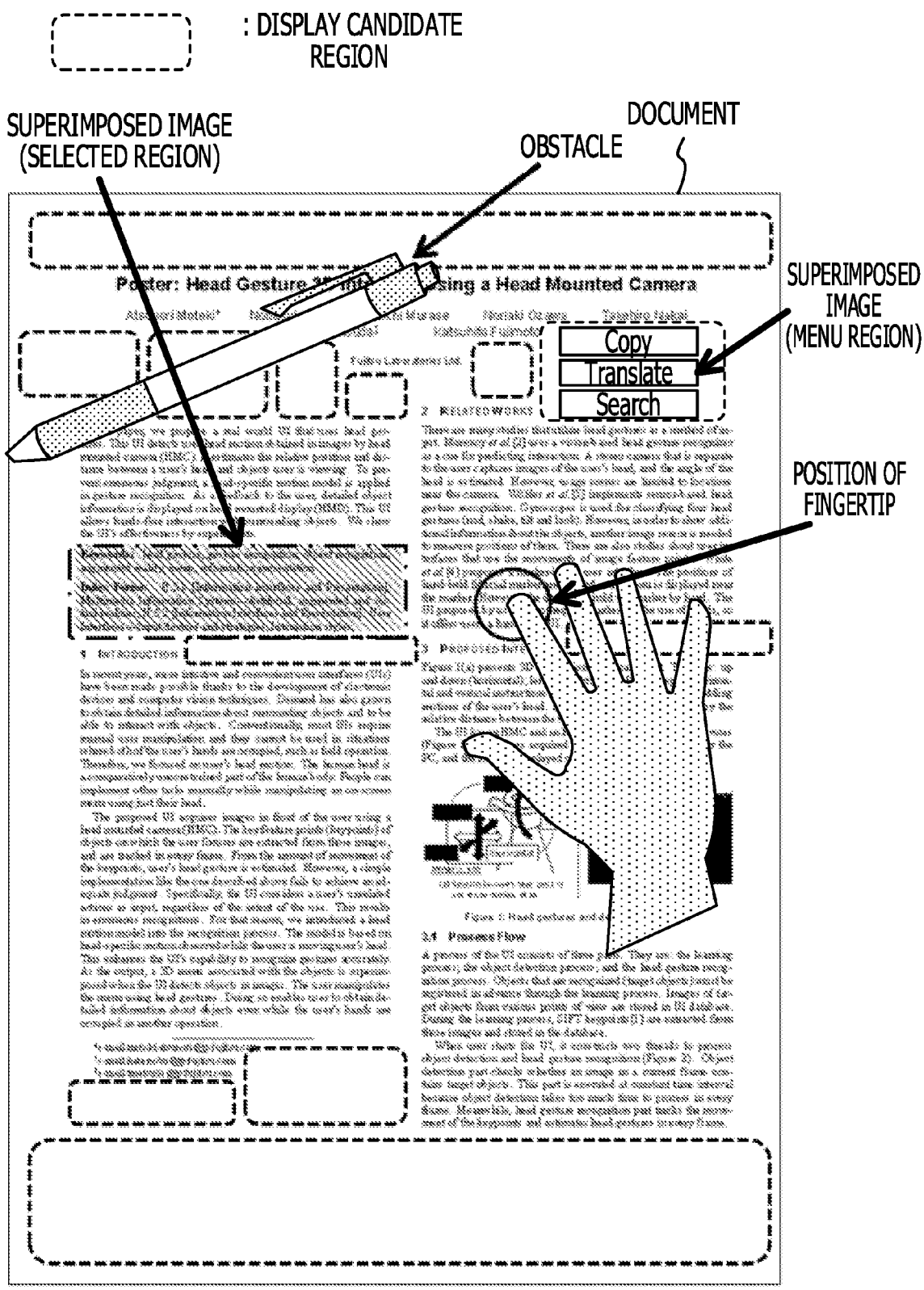
FIG. 11 illustrates an example of use of the image processing device including an example of projection of a superimposed image.

FIG. 11 illustrates an example of use of the image processing device 1 including an example of projection of a superimposed image. As illustrated in FIG. 11, there are two kinds of projected superimposed images, that is, information on a region (selected region) selected at the time of specifying, by a fingertip, a region where interactive operations with a document are desired, and the menu region for interactive operations to be added to the region. When the region is specified by the operation of a fingertip, the fingertip is brought into contact with the plane where a document exists, that is, the document projection plane at an end point of the rectangle of the region, and is moved to another end point of the rectangle while remaining in contact with the plane, and is separated from the projection plane upon arrival to that end point. In order to determine whether the fingertip is in contact with the plane, the above determination as to the pressing performed by the extraction unit 5 may be used. During specification of the target region, a superimposed image related to the target region is displayed.

After the specification of the region mentioned above, a superimposed image (menu region) that allows for interaction operations using a fingertip is displayed. When wanting to save the content of a document for which the region has been selected by a fingertip, the user brings a fingertip to a location of "COPY" in the menu and pressing the fingertip at the location, thereby enabling a partial image of the selected region to be stored in the storage unit 8.

Figure 12:
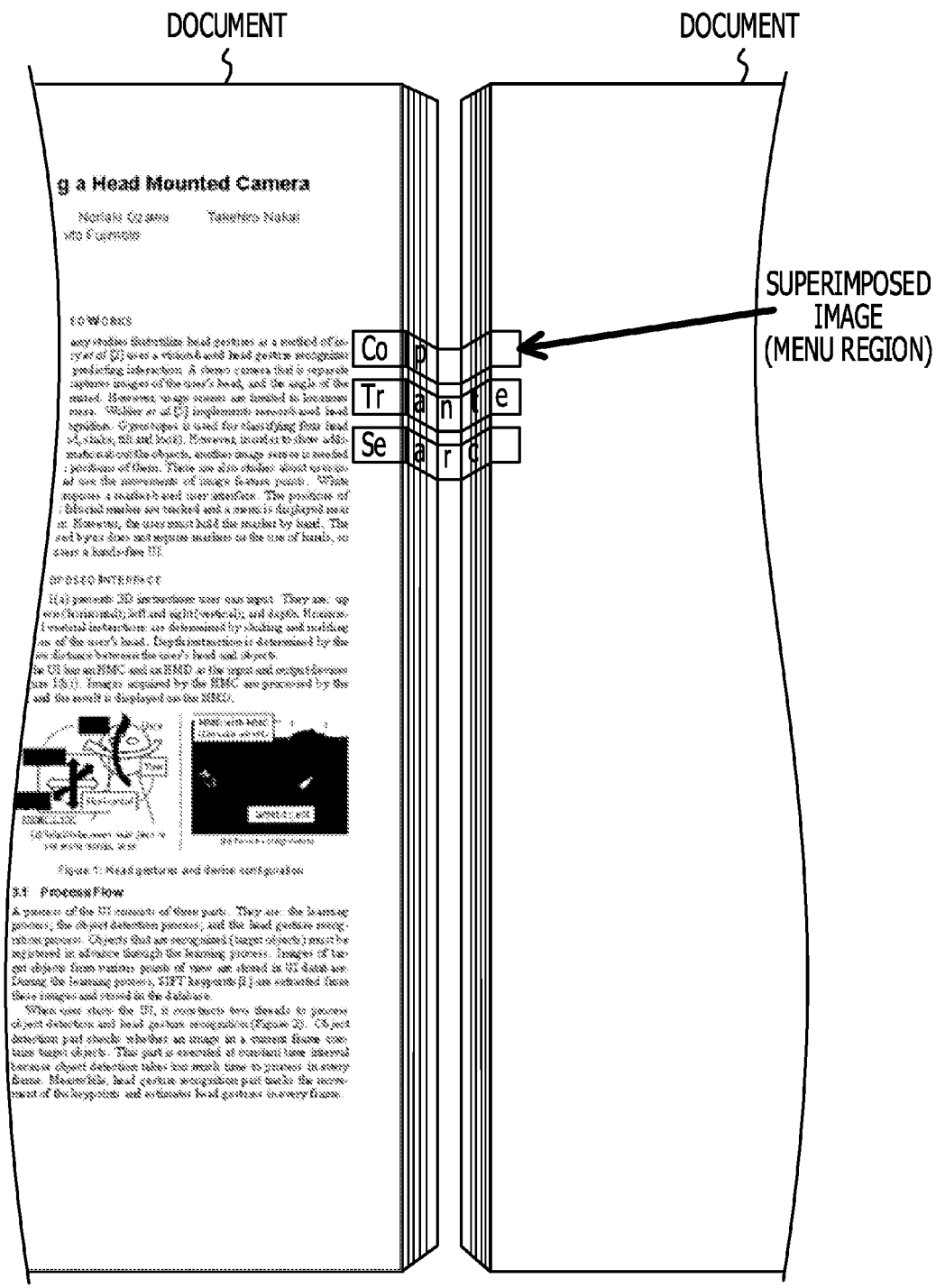
FIG. 12 illustrates an example of projection of a superimposed image serving as a comparative example of a first embodiment.

As illustrated in FIG. 11, when a superimposed image of the menu region is projected in order to perform interaction operations to the region selected by the user, applying the first embodiment makes it possible to avoid uneven regions, such as a document region and a pen, and to display the superimposed image in a display candidate region nearest to a fingertip. FIG. 12 illustrates an example of projection of a superimposed image serving as a comparative example of the first embodiment. In the comparative example illustrated in FIG. 12, it is assumed that the display candidate region is defined at random only from the feature points and projection is performed in the defined display candidate region. In the method of the comparative example, as illustrated in FIG. 12, a step portion of a book may be selected as the projection region of a superimposed image. Such a region with low flatness causes reduced visibility and operability, and therefore it may be understood that the region is not suitable for the display position of a superimposed image.

According to the first embodiment, it becomes possible to project a superimposed image on an optimal place in consideration of visibility and operability. From the viewpoint of visibility, by projecting a superimposed image on a region that is not a document region, an overlap between a document including a character or figure and a superimposed image is inhibited, and the visibility of both the document and the superimposed image improves. By projecting a superimposed image on a region with low flatness, the influence of a distortion of the superimposed image caused by unevenness may be reduced. In addition, projecting a superimposed image on a region with low flatness allows the user to eventually recognize that the superimposed image is an operable object (practical use of affordance), and thus the operability improves.

Figure 13:
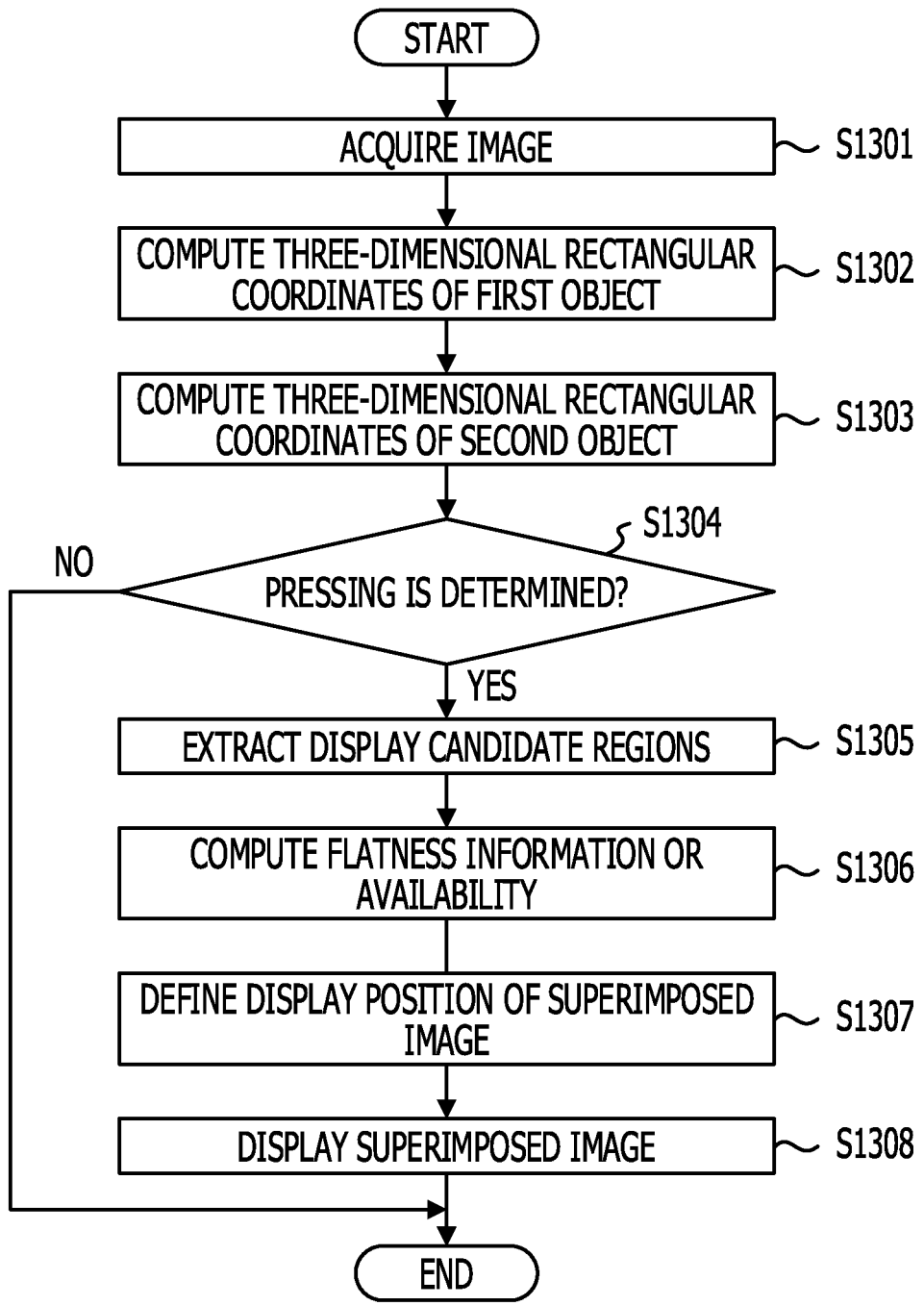
FIG. 13 is a flowchart of image processing performed by the image processing device.

FIG. 13 is a flowchart of image processing performed by the image processing device 1. The acquisition unit 3 receives an image captured by the image sensor 2 from the image sensor 2 (step S1301). Note that, in the first embodiment, at least two image sensors 2 are disposed in a stereo arrangement, and a plurality of image sensors 2 are designed to capture images simultaneously or continuously. It is assumed that a document including a character or figure or the user's fingertip, for example, is included in an image acquired by the acquisition unit 3. Note that a document including a character or figure may be referred to as the first object, and the user's fingertip may be referred to as the second object. The acquisition unit 3 outputs the acquired image to the computation unit 4 and the extraction unit 5.

The computation unit 4 receives the image from the acquisition unit 3, and computes the three-dimensional rectangular coordinates of the projection plane of the first object, and the three-dimensional rectangular coordinates of the second object (steps S1302 and S1303). Note that the data structures of the three-dimensional rectangular coordinates of the projection plane of the first object and the three-dimensional rectangular coordinates of the second object computed by the computation unit 4 are illustrated in the table 30 of FIG. 3 and the table 50 illustrated in FIG. 5, for example.

The extraction unit 5 receives the image from the acquisition unit 3, and performs a determination as to pressing of the user's fingertip using the active stereo method mentioned above (step S1304). If the extraction unit 5 detects that at least one fingertip is pressed on the document projection plane (Yes at step S1304), the extraction unit 5 extracts a display candidate region or display candidate regions (step S1305). If the extraction unit 5 does not detect that a fingertip is pressed on the document projection plane (No at step S1304), the extraction unit 5 terminates the image processing, or continues projection when the superimposed image has been projected at the preceding time.

The computation unit 4 computes the flatness information and availability of the display candidate region using expression 2 and expression 5 mentioned above. The data structure of the availability computed by the computation unit 4 is illustrated in the table 100 of FIG. 10, for example.

The definition unit 6 defines the display position of the superimposed image (step S1307). The definition unit 8 defines the display position of the superimposed image (defining one region from a plurality of display candidate regions) on the basis of the availability illustrated in the table 100 of FIG. 10 and the flatness information computed from expression 5 mentioned above. The definition unit 6 outputs the display position of the superimposed image to the projection unit 7.

The projection unit 7 projects the superimposed image on the projection plane of the first object at a position defined by the definition unit 6 (step S1308), and then the image processing device 1 ends the image processing illustrated in FIG. 13.

(Second Embodiment)

In the first embodiment, the embodiment has been described with the configuration of the image processing device 1 in which a plurality of image sensors 2 (stereo camera) are used. However, the present disclosure may be carried out in a case where one camera and one depth sensor are used instead of the stereo camera. Such a case will therefore be described in a second embodiment. If either of the two image sensors 2 of the hardware configuration diagram illustrated in FIG. 2 is replaced with a depth sensor, the hardware configuration diagram of the image processing device 1 in the second embodiment 2 is feasible, and therefore will not be illustrated. For depth sensors, there are a time-of-flight (TOF) measurement that measures the depth from the both-way time of a laser beam, a pattern irradiation method that measures a distortion of light pattern when an object is irradiated with laser light rays having a specific pattern, and so on. In the second embodiment, any method may be adopted. Note that the image sensor 2 and a depth sensor are disposed above the document projection plane and downward in a direction perpendicular to the document projection plane. The internal parameters of the image sensor 2 are known as in the first embodiment. The depth sensor and the image sensor 2 are disposed such that the optical axes of the depth sensor and the image sensor 2 are parallel to each other and the horizontal axes in the images lie on the same straight line. Note that the functional block diagram of the image processing device 1 in the second embodiment is the same as that of FIG. 1.

In the second embodiment, by using the depth sensor, the hand region outline and the depth are able to be computed. The computation unit 4 uses data called a distance image, which is acquired from the depth sensor. Note that the distance image is an image having a value of the distance from the depth sensor to an object, instead of the values of colors and shades of a usual two-dimensional image. In the second embodiment, a learning process is desired before the start of image processing. In the learning process concerned, many templates for distance images of a hand are stored in a database, which is not illustrated, in the storage unit 8 of FIG. 1, for example. Then, the user manually cuts a hand region and specifies the fingertip coordinate from each distance image. The hand outline region is normalized to a certain size and is saved in the storage unit 8. In the second embodiment, the image processing device 1 repeats above-mentioned learning process until a certain template is obtained.

In the second embodiment, after the start of image processing, the computation unit 4 acquires a distance image at the current time from the depth sensor. Thereafter, a distance image is scanned using a window having an arbitrary magnification. For each window, template matching may be performed. In this matching, the similarity between the distance image in a window and all the templates is computed and a template with the highest similarity is selected. Note that, as one example of computation of the similarity, sum of squared difference (SSD), normalized cross-correlation (NCC), and so on may be used. After selecting an optimal template, the computation unit 4 acquires the position information on the fingers held in the optimal template, and acquires the values of depths corresponding to the finger positions in the current distance image. The data structure acquired in the processing concerned is the same as the table 41 illustrated in FIG. 4B. Other processing is the same as in the first embodiment, detailed description thereof will not be further described.

(Third Embodiment)

Figure 14:
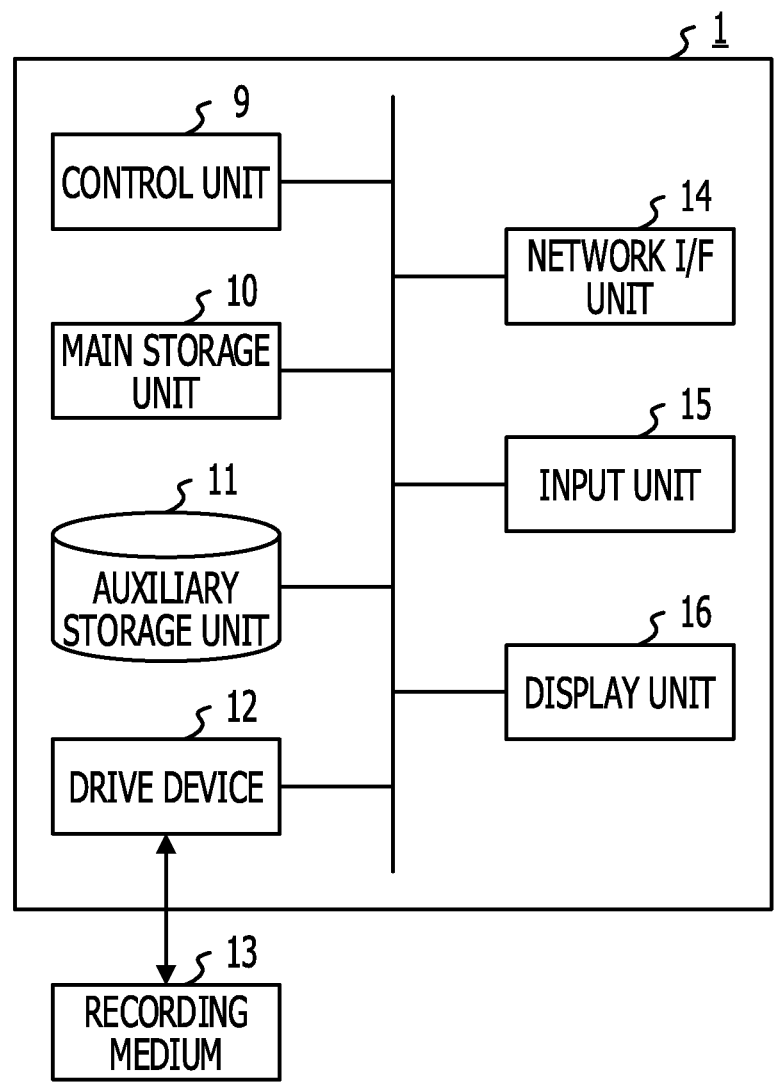
FIG. 14 is a hardware configuration diagram of a computer that functions as the image processing device according to one embodiment.

FIG. 14 is a hardware configuration diagram of a computer that functions as the image processing device 1 according to one embodiment. As illustrated in FIG. 14, the image processing device 1 includes a control unit 9, a main storage unit 10, an auxiliary storage unit 11, a drive device 12, a network interface (I/F) unit 14, an input unit 15, and a display unit 16. These units of the configuration are connected through a bus so as to be capable of transmitting and receiving to and from one another.

The control unit 9 is a central processing unit (CPU) that controls each device and performs operations and processing of data in a computer. The control unit 9 is an arithmetic unit that executes programs stored in the main storage unit 10 and the auxiliary storage unit 11, and receives data from the input unit 15 and the storage devices and performs operations and processing of data and then outputs the data to the display unit 16, storage devices, and so on.

The main storage unit 10, which is a ROM or a RAM, is a storage device that stores or temporarily saves programs of an operating system (OS), which is basic software, and application software to be executed by the control unit 9 and data.

The auxiliary storage unit 11, which is an HDD or the like, is a storage device that stores data relevant to the application software and so on.

The drive device 12 reads a program from the recording medium 13, for example, a flexible disk, and installs the program in the auxiliary storage unit 11. A predetermined program is stored in the recording medium 13, and the program stored in the recording medium 13 is installed through the drive device 12 in the image processing device 1. The installed predetermined program is executable by the image processing device 1.

The network I/F unit 14 is an interface between a peripheral device having a communication function that is connected over networks such as a local area network (LAN) and a wide area network (WAN), which are built up of data transmission paths such as wired and/or wireless lines, and the image processing device 1.

The input unit 15 has a keyboard provided with cursor keys, numeric keys, various function keys, and so on, and a mouse, a slice pad, and so on for selecting a key on the display screen of the display unit 16. The input unit 15 is a user interface through which the user provides operation instructions to the control unit 9 or inputs data.

The display unit 16 is made of a cathode ray tube (CRT), a liquid crystal display (LCD), or the like. Display in accordance with display data input from the control unit 9 is performed in the display unit 16. It is possible to apply the projection unit 7 illustrated in FIG. 1 as the display unit 16.

Note that the image processing method described above may be implemented as a program that causes a computer to execute the process. By installing the program from a server or the like and causing the program to be executed by a computer, the image processing method described above may be implemented.

It is also possible to implement the image processing described above by recording the program on the recording medium 13 and causing a computer or a portable terminal to read the program from the recording medium 13. Note that the recoding medium 13 may use various types of recording media including recording media for optically or magnetically recording information, such as a compact disc (CD)-ROM, a flexible disk, and magneto-optical disc, and semiconductor memories for electrically recording information, such as a ROM and a flash memory.

Additionally, each element of each device illustrated in the drawings does not have to be physically configured as illustrated. That is, the specific forms of distribution and integration of devices are not limited to those illustrated in the drawings, and the devices, in whole or in part, may be configured by functionally or physically distributing and integrating in arbitrary units in accordance with the various loads and use situations. Various kinds of processing described in the above embodiments may be implemented by causing programs prepared in advance to be executed by a computer such as a personal computer or a work station.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device comprising:
a processor;
a projector configured to be controlled by the processor; and
a memory which stores a plurality of instructions, which when executed by the processor, cause the processor to execute:
acquiring an image, including a first object having a character or a figure and a second object, captured by an image sensor;
computing, from the image, flatness information on flatness of a projection plane of the first object on which a superimposed image is to be displayed by the projector, wherein the superimposed image is relevant to the character or the figure and includes additional information associated with the first object, wherein the flatness information is defined from three-dimensional rectangular coordinates of the first object computed from the image;
extracting display candidate regions based on a predetermined feature quantity with respect to the first object and the three-dimensional rectangular coordinates of the first object computed from the image;
defining plane rectangular coordinates serving as a display position, which is a partial part of the first object for displaying the superimposed image by the projector on the basis of the flatness information and a dispersion of the plurality of the display candidate regions relative to a reference point; and
projecting the superimposed image on the partial part of the first object.

2. The device according to claim 1,
wherein there are a plurality of the images, and, in the computing, three-dimensional rectangular coordinates of a user's fingertip serving as the second object are computed on the basis of coordinates of the fingertip included in each of the plurality of images and a reference point of the three-dimensional rectangular coordinates.

3. The device according to claim 1, wherein there are a plurality of the images, and, in the computing, three-dimensional rectangular coordinates of the projection plane including the character or the figure of the first object are computed on the basis of an amount of change in each of a plurality of pixels of a superimposed image included in each of the plurality of the images.

4. The device according to claim 1,
wherein, in the defining, the display candidate region in which dispersion is equal to or less than a first threshold is selected among the plurality of the display candidate regions, and the plane rectangular coordinates are defined.

5. The device according to claim 1,
wherein, in the defining, plane rectangular coordinates of the superimposed image are defined on the basis of relative positions of the projecting and the first object.

6. An image processing method comprising:
- acquiring an image including a first object having a character or a figure and a second object, captured by an image sensor;
- computing, from the image, flatness information on flatness of a projection plane of the first object on which a superimposed image is to be displayed by a projector, wherein the superimposed image is relevant to the character or the figure and includes additional information associated with the first object, wherein the flatness information is defined from three-dimensional rectangular coordinates of the first object computed from the image;
- extracting display candidate regions based on a predetermined feature quantity with respect to the first object and the three-dimensional rectangular coordinates of the first object computed from the image;
- defining, by a computer processor, plane rectangular coordinates serving as a display position which is a partial part of the first object displaying the superimposed image by the projector on the basis of the flatness information and a dispersion of the plurality of the display candidate reqions relative to a reference point; and
- projecting the superimposed image on the partial part of the first object.

7. The method according to claim 6,
wherein there are a plurality of the images, and, in the computing, three-dimensional rectangular coordinates of a user's fingertip serving as the second object are computed on the basis of coordinates of the fingertip included in each of the plurality of images and a reference point of the three-dimensional rectangular coordinates.

8. The method according to claim 6, wherein there are a plurality of the images, and, in the computing, three-dimensional rectangular coordinates of the projection plane including the character or the figure of the first object are computed on the basis of an amount of change in each of a plurality of pixels of a superimposed image included in each of the plurality of the images.

9. The method according to claim 6,
wherein, in the defining, the display candidate region in which dispersion is equal to or less than a first threshold is selected among the plurality of the display candidate regions, and the plane rectangular coordinates are defined.

10. The method according to claim 6,
wherein, in the defining, plane rectangular coordinates of the superimposed image are defined on the basis of relative positions of the projecting and the first object.

11. A non-transitory computer-readable storage medium storing an image processing program that causes a computer to execute a process comprising:
- acquiring an image, including a first object having a character or a figure and a second object, captured by an image sensor;
- computing, from the image, flatness information on flatness of a projection plane of the first object on which a superimposed image is to be displayed by a projector, wherein the superimposed image is relevant to the character or the figure and includes additional information associated with the first object, wherein the flatness information is defined from three-dimensional rectangular coordinates of the first object computed from the image;
- extracting display candidate regions based on a predetermined feature quantity with respect to the first object and the three-dimensional rectangular coordinates of the first object computed from the image;
- defining plane rectangular coordinates serving as a display position which is a partial part of the first object, and displaying the superimposed image by a projector on the basis of the flatness information and a dispersion of the plurality of the display candidate regions relative to a reference point; and
- projecting the superimposed image on the partial part of the first object.

\* \* \* \* \*